(12) United States Patent
Arunachalam et al.

(10) Patent No.: US 8,255,253 B2
(45) Date of Patent: Aug. 28, 2012

(54) CROSS FUNCTIONAL AREA SERVICE IDENTIFICATION METHOD AND SYSTEM

(75) Inventors: Ravi Shankar Arunachalam, Bangalore (IN); Ahamed Jalaldeen, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 12/477,276

(22) Filed: Jun. 3, 2009

(65) Prior Publication Data
US 2010/0312590 A1 Dec. 9, 2010

(51) Int. Cl.
*G06Q 10/00* (2012.01)
(52) U.S. Cl. .................................... 705/7.11
(58) Field of Classification Search .................. 705/7.11
See application file for complete search history.

(56) References Cited

U.S. PATENT DOCUMENTS

| | | | |
|---|---|---|---|
| 2005/0062193 A1* | 3/2005 | Katai | 264/216 |
| 2006/0161513 A1* | 7/2006 | Drumm et al. | 707/1 |
| 2006/0229925 A1 | 10/2006 | Chalasani et al. | |
| 2007/0078861 A1* | 4/2007 | Aidun | 707/10 |
| 2007/0245297 A1* | 10/2007 | Kuester et al. | 717/104 |
| 2008/0004923 A1* | 1/2008 | Hacigumus | 705/7 |
| 2008/0022225 A1* | 1/2008 | Erl | 715/784 |
| 2008/0124047 A1* | 5/2008 | Ko et al. | 386/96 |
| 2008/0126147 A1* | 5/2008 | Ang et al. | 705/7 |
| 2008/0140760 A1* | 6/2008 | Conner et al. | 709/201 |
| 2008/0141760 A1* | 6/2008 | Sienkowski et al. | 73/40.5 R |
| 2008/0184250 A1 | 7/2008 | Hamadi et al. | |
| 2009/0113289 A1* | 4/2009 | Zhang et al. | 715/239 |
| 2009/0138273 A1* | 5/2009 | Leung | 705/1 |

FOREIGN PATENT DOCUMENTS
WO WO2007041226 A2 4/2007

OTHER PUBLICATIONS

Arsanjani, Ali."Service-Oriented modeling and architecture: How to identify, specify and realize services for your SOA." Nov. 2004.*
Duermeyer, Karin."Methodology: From Component Business Model to Service Oriented Architecture." IBM Business Consulting Services, May 2004.*
Zhang, Liang-Jie, Arsanjani, Ali, Allam, Abdul, Lu, Dingding and Chee, Yi-Min."Variation-Oriented Analysis for SOA Solution Design." IBM Corporation, Iowa State University, IEEE International Conference of Services Computing, 2007.*

(Continued)

*Primary Examiner* — Beth V Boswell
*Assistant Examiner* — Renae Feacher
(74) *Attorney, Agent, or Firm* — Schmeiser, Olsen & Watts; John Pivnichny

(57) ABSTRACT

A cross-functional area service identification method and system. The method includes reading by a computing system, processes. The computing system processes process elements associated with the processes. The computing system identifies a first functional area associated with a first current process element of the process elements and a second functional area associated with a first parent process element of the first current process element. The computing system compares the first functional area to the second functional area and determines if the first functional area comprises a same functional area as the second functional area. The computing system generates and stores results indicating if the first functional area comprises a same functional area as the second functional area.

17 Claims, 5 Drawing Sheets

OTHER PUBLICATIONS

Heinrich, Bernd, Henneberger, Matthias, Leist, Susanne and Zellner, Gregor. "The process map as an instrument to standardize processes: design and application at a financial servie provider." Springer-Verlag, Nov. 2007.*

Artus, David. "SOA Realization: Service Design Principles." IBM, Feb. 2006, <www.ibm.com/developerworks/webservices/library/ws-soa-design>.*

"Running your IT Organization like you mean business. The IBM Business of IT Executive Workshop." IBM Global Technology Services Executive Brief, Mar. 2007.*

"Enabling "Real World SOA" through the Microsoft Platform." Microsoft Corporation, Dec. 2006.*

"Service-oriented modeling and architecture" IBM DeveloperWorks, Nov. 2004, <www.ibm.com/developerworks/library/ws-soa-design1/.*

* cited by examiner

US 8,255,253 B2

CROSS FUNCTIONAL AREA SERVICE IDENTIFICATION METHOD AND SYSTEM

FIELD OF THE INVENTION

The present invention relates to a method and associated system for identifying services for exposure from cross-functional area invocations.

BACKGROUND OF THE INVENTION

Identifying data for presenting to a user typically comprises an inefficient process with little flexibility. Accordingly, there exists a need in the art to overcome at least some of the deficiencies and limitations described herein above.

SUMMARY OF THE INVENTION

The present invention provides a method comprising:
reading, by a computing system, processes comprised by a service oriented architecture (SOA) project, wherein said processes comprise process elements;
identifying, by said computing system, a first functional area associated with a first current process element of said process elements;
identifying, by said computing system, a second functional area associated with a first parent process element of said first current process element;
comparing, by said computing system, said first functional area to said second functional area;
determining, by a computer processor of said computing system based on results of said comparing said first functional area to said second functional area, if said first functional area comprises a same functional area as said second functional area;
generating, by said computing system, results of said determining; and
storing, by said computing system, said results.

The present invention provides a method comprising:
reading, by a computing system, processes comprised by a service oriented architecture (SOA) project, wherein said processes are associated with process elements;
first determining, by said computing system, if a first functional area associated with a first current process element of said process elements is available;
second determining, by said computing system, if a second functional area associated with a first parent process element of said first current process element, wherein first results of said first determining and said second determining indicate that said first functional area or said second functional area is unavailable;
identifying, by said computing system in response to said first results, a first business component associated with said first current process element;
identifying, by said computing system in response to said first results, a second business component associated with said first parent process element;
comparing, by said computing system, said first business component to said second business component;
third determining, by a computer processor of said computing system based on results of comparing said first business component to said second business component, if said first business component comprises a same business component as said second business component;
generating, by said computing system, results of said third determining; and
storing, by said computing system, said results.

The present invention advantageously provides a simple method and associated system capable of identifying data for presenting to a user.

DETAILED DESCRIPTION OF THE INVENTION

Figure 1:
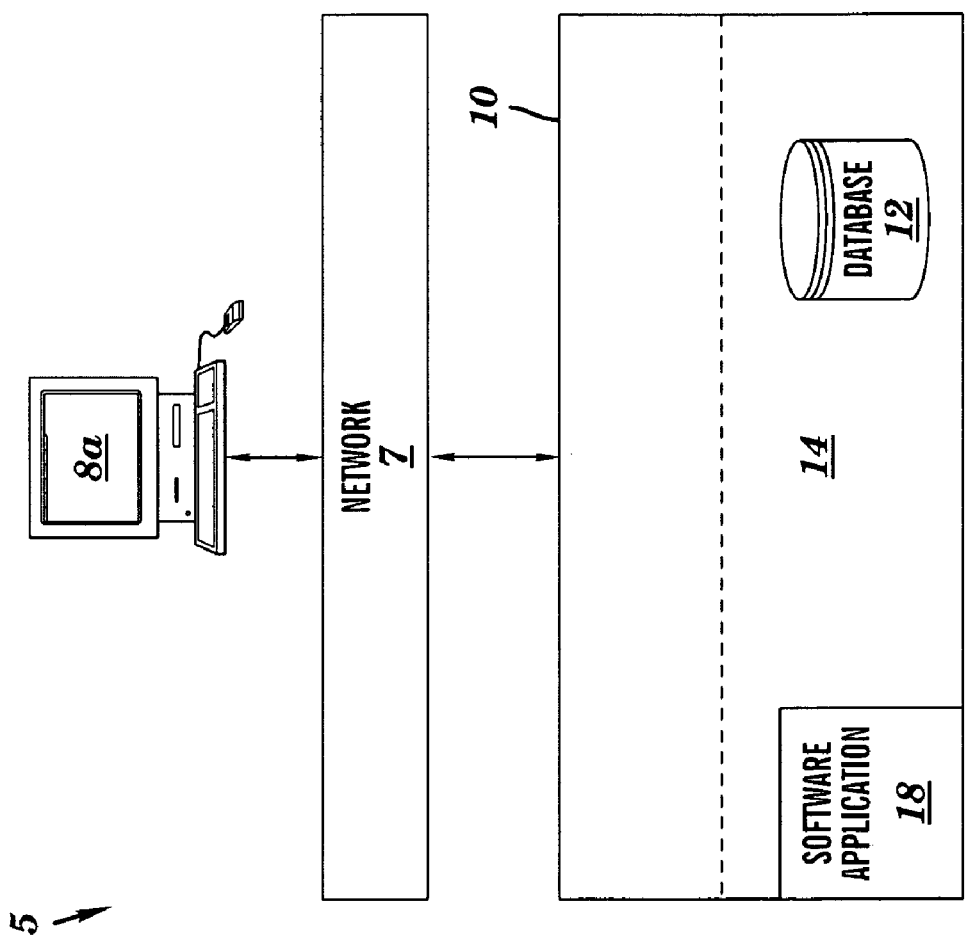
FIG. 1 illustrates a system for identifying services for exposure, in accordance with embodiments of the present invention.

FIG. 1 illustrates a system 5 for identifying services for exposure from business process maps, in accordance with embodiments of the present invention. Although the term "business" is used throughout detailed description to describe various components of system 5, note that any term describing an organization may be used instead. For example, the term "business" may be replaced by, inter alia, the following terms: enterprise, entity, organization, group, etc. Alternatively, the term business may be removed from any of the components of system 5. For example, "business process map" may be referred to as a "process map".

Services are associated with a service oriented architecture (SOA) project. SOA comprises enterprise scale IT architecture for providing IT agility to support agility. A service is defined herein as:
1. Business perspective: A well defined, encapsulated, reusable, business-aligned capability. A service is fully defined via a service description.
2. IT Perspective: A discoverable and invokable software resource having a service description/interface and configurable using policies.

Activities in a process that are invoked across functional areas or business component boundaries are typically good candidates for service exposure. A functional area is defined herein as a logical grouping of business capabilities (functionalities) that provide related business functions and require similar skills and expertise. A business is composed of domains. Domains are broken down (decomposed) into functional areas. Functional areas provide a set of cohesive business functions for a domain. A business component may be re-factored into one or more functional areas. A component business model (CBM) comprises business competencies, business components, and business services and their relationships that together describe an enterprise or industry. A business component is defined herein as a logical view of a portion of an entity that includes resources, processes, people, services, and technology to deliver value to the rest of the entity. System 5 comprises an algorithm (e.g., see algorithm of FIG. 2) for analyzing business process elements and corresponding functional areas or business components in order to identify cross-functional area services. A business process element is defined herein as an element (e.g., process, sub-process, task, etc) of a collection of interrelated tasks for accomplishing a specific goal. The business process elements correspond to candidate services. The algorithm identifies services from cross-functional area invocations by using information captured during business process definition and service model creation. A service model is defined herein as an abstraction of IT services implemented within an enterprise that supports development of SOA solutions. A service model is used to conceive and document a design of software services. A service model comprises core elements of SOA and is used as an input for implementation activities. A candidate service is defined herein as a service is an early stage of a service life-cycle. For example, in a typical SOA project, there are several candidate services identified from various sources but only a portion or subset of the candidate services are transformed to real services. Real services are referred to as exposed services in a service life-cycle. An exposed service is a service qualified for exposure.

System 5 of FIG. 1 comprises a computing apparatus 8a connected to a computing system 10 through a network 7. Network 7 may comprise any type of network including, inter alia, a local area network, (LAN), a wide area network (WAN), the Internet, etc. Computing apparatus 8a may comprise any type of computing apparatus including, inter alia, a personal computer, a laptop computer, a computer terminal, etc. Computing apparatus 8a may comprise a single computing apparatus or a plurality of computing apparatuses. Computing apparatus 8a is used by end users for communicating with (e.g., entering data) computing system 10. Computing system 10 may comprise any type of computing system(s) including, inter alia, a personal computer (PC), a server computer, a database computer, etc. Computing system 10 is used to retrieve data from computing apparatus 8a identifying services for exposure from business process maps. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved data (i.e., retrieved from computing apparatus 8a such as, inter alia, SOA projects, candidate services data, business process elements data, functional area data, exposed services data, etc) and any generated data (e.g., results data, reports, etc).

Software application 18 performs the following functions associated with an automated process identifying services for exposure from business process maps:

1. Software application 18 identifies root level business processes.
2. Software application 18 identifies a functional area of a current business process element. If the functional area of the current business process element is not found, then step 6 is executed as described, infra.
3. Software application 18 identifies a functional area of a parent business process element.
4. Software application 18 compares the functional area of the current business process element to the functional area of the parent business process element to determine if they are the same. If software application 18 determines that the functional areas are the same, step 10 is executed as described, infra.
5. If software application 18 determines that the functional areas are not the same, software application 18 marks a service corresponding to the current business process element as a potential service and step 10 is executed as described, infra.
6. Software application 18 identifies (i.e., if the functional area of the current business process element was not found in step 2, supra) a business component of the current business process element.
7. Software application 18 identifies a business component of the parent business process element.
8. Software application 18 compares the business component of the current business process element to the business component of the parent business process element to determine if they are the same. If software application 18 determines that the business components are the same, step 10 is executed as described, infra.
9. If software application 18 determines that the business components are not the same, software application 18 marks a service corresponding to the current business process element as a potential service.
10. Software application 18 determines if more business process elements require processing. If software application 18 determines that more business process elements require processing then step 2 is repeated.

The following example illustrates an implementation scenario for executing a process for identifying services for exposure from business process maps:

EXAMPLE 1

1. Business process model elements are mapped with corresponding business components in a component business model (CBM). A CBM comprises business competencies, business components, and business services that together describe an enterprise or industry. A granularity of business components and functional areas may comprise a one-to-one relationship or a one-to-many relationship.
    A. Business components: account & policy administration and accounting management (e.g., see FIG. 3).
    B. Business processes: manage accounts, open account, and close account mapped to an account & policy administration business component (e.g., see FIG. 4).
    C. Business processes: process transactions mapped to an account management business component.
2. A SOA architect invokes a user interface to identify a set of services for exposure from a business process map.
3. Software application 18 retrieves business process elements from the business process map. A business process map or model is defined herein as a maps or model that describes the work that an organization is involved in and a behavior of systems that the organization uses. These maps or models used to identify inefficiencies in current processes thereby leading to an identification of opportunities for automation and business transformation.
    A. Business processes: manage accounts, open account, process transactions, close account (e.g., see FIG. 4).
3. Software application 18 verifies existence of mapping data indicating relationships between business process elements (process, sub-process or task) and functional areas.
    A. Process: manage accounts is not mapped to a functional area.
    B. Sub-process: open account is not mapped to a functional area.
    C. Sub-process: process transactions is not mapped to a functional area.
    D. Sub-process: close account is not mapped to a functional area.
4. Software application 18 verifies an existence of mapping data from parent elements of a business process (process, sub-process or task) to a functional area.
    A. Process: parent elements of manage accounts are not mapped to a functional area.
    B. Sub-process: parent elements of open account are not mapped to a functional area C. Sub-process: parent elements of process transactions are not mapped to a functional area.
D. Sub-process: parent elements of close account are not mapped to functional area.
5. Software application 18 verifies the existence of mapping data from a business process element (process, sub-process or task) to a business component.
   A. Process: manage accounts, business component: account & policy administration.
   B. Sub-process: open account is not mapped to a business component.
   C. Sub-process: process transactions, business component: accounting management
   D. Sub-process: close account is not mapped to a business component.
6. Software application 18 verifies the existence of mapping data from parent elements of the business process (process, sub-process or task) to a business component.
   A. Sub-process: open account, parent element of open account is mapped to an account & policy administration business component.
   B. Sub-process: close account, parent element of close account is mapped to an account & policy administration business component.
7. Software application 18 verifies if a business component of the current business process element and a parent element of the current business process element are same.
   A. Current business process element: process transactions, business component: accounting management
   B. Parent business process element: manage accounts, business component: account & policy administration.
8. Software application 18 identifies a service corresponding to the current business process element as potential service.
   A. Business process: process transactions, service: process transactions.

Figure 2:
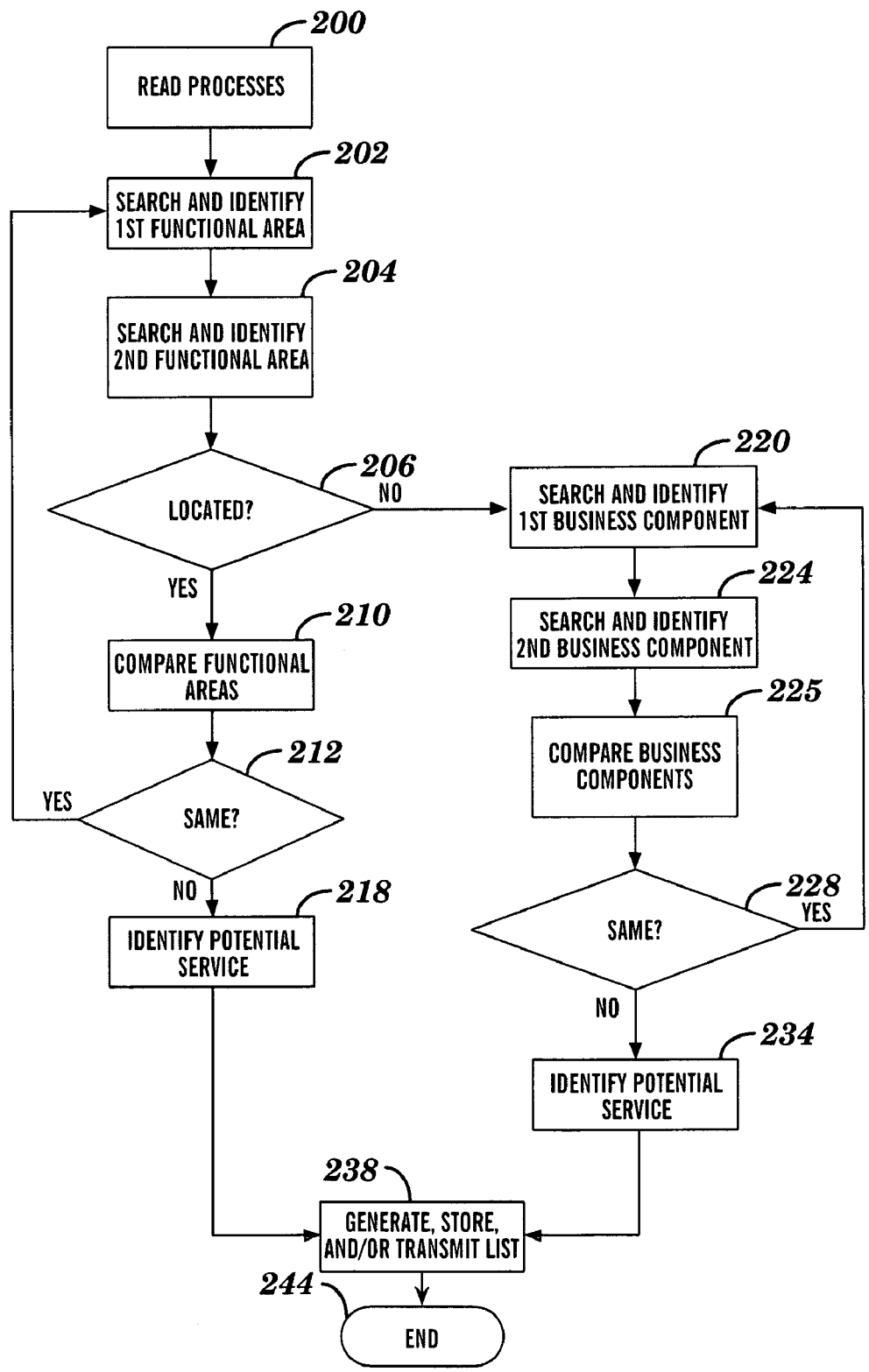
FIG. 2 illustrates a flowchart describing an algorithm used by the system of FIG. 1 for identifying services for exposure, in accordance with embodiments of the present invention.

FIG. 2 illustrates a flowchart describing an algorithm used by system 5 of FIG. 1 for identifying services for exposure, in accordance with embodiments of the present invention. In step 200, a computing system (e.g., computing system 10 of FIG. 1) identifies processes (e.g., associated with an entity, business, etc) comprised by a service oriented architecture (SOA) project. The processes are comprised of process elements (process, sub-process, task, etc). In step 202, the computing system searches for and identifies (i.e., if located) a first functional area associated with a first current process element of the process elements. In step 204, the computing system searches for and identifies (i.e., if located) a second functional area associated with a first parent process element of the first current process element. In step 206, it is determined if the first functional area or the second functional area has been located.

If in step 206, it is determined that the first functional area and the second functional area has been located, then in step 210 the first functional area is compared to the second functional area. In step 212, it is determined if the functional areas are the same (i.e., based on results of the comparison process performed in step 210). If in step 212, it is determined that the functional areas are the same then step 202 is repeated with respect to additional functional areas. If in step 212, it is determined that the functional areas are not the same then in step 218, the computing system identifies a service associated with the first current process element as a first service for exposure. In step 238, the computing system generates, stores, and/or transmits (to a user) a list (i.e., comprising the first service).

If in step 206, it is determined that either the first functional area or the second functional area has not been located then in step 220, the computing system searches for and identifies a first business component associated with the first current process element of the process elements. In step 204, the computing system searches for and identifies a second business component associated with the first parent process element of the first current process element. In step 225, the first functional area is compared to the second functional area. In step 228, it is determined if the business components are the same (i.e., based on results of the comparison process performed in step 225). If in step 228, it is determined that the business components are the same then step 220 is repeated with respect to additional process elements. If in step 228, it is determined that the business components are not the same then in step 234, the computing system identifies a service associated with the first current process element as a first service for exposure. In step 238, the computing system generates, stores, and/or transmits (to a user) a list (i.e., comprising the first service).

Figure 3:
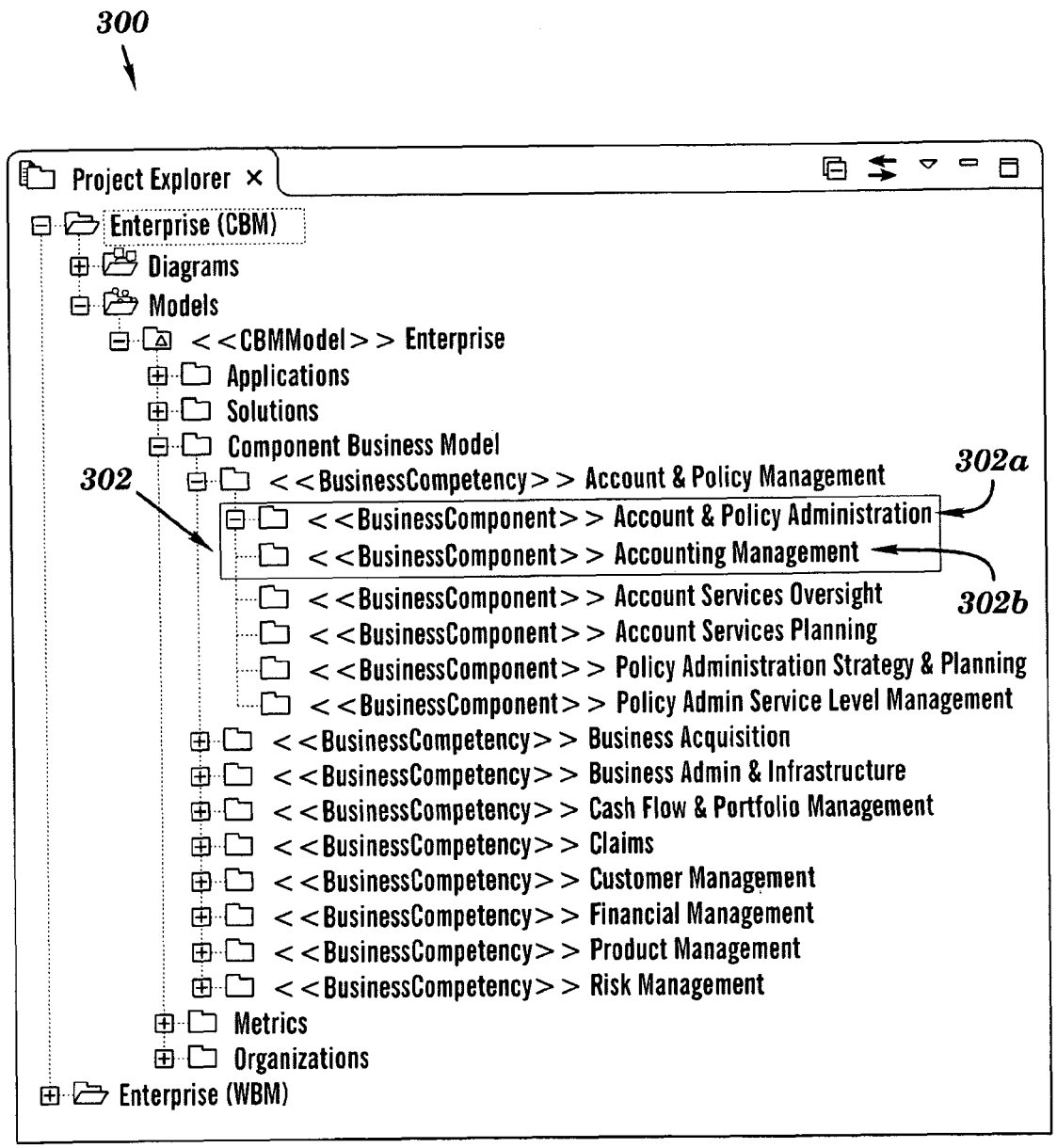
FIG. 3 illustrates a screen shot of business components, in accordance with embodiments of the present invention.

FIG. 3 illustrates a screen shot 300 of business components 302, in accordance with embodiments of the present invention. The business components 302 comprise an account & policy administration business component 302a and an accounting management business component 302b as described with respect to example 1 described with reference to FIG. 1.

Figure 4:
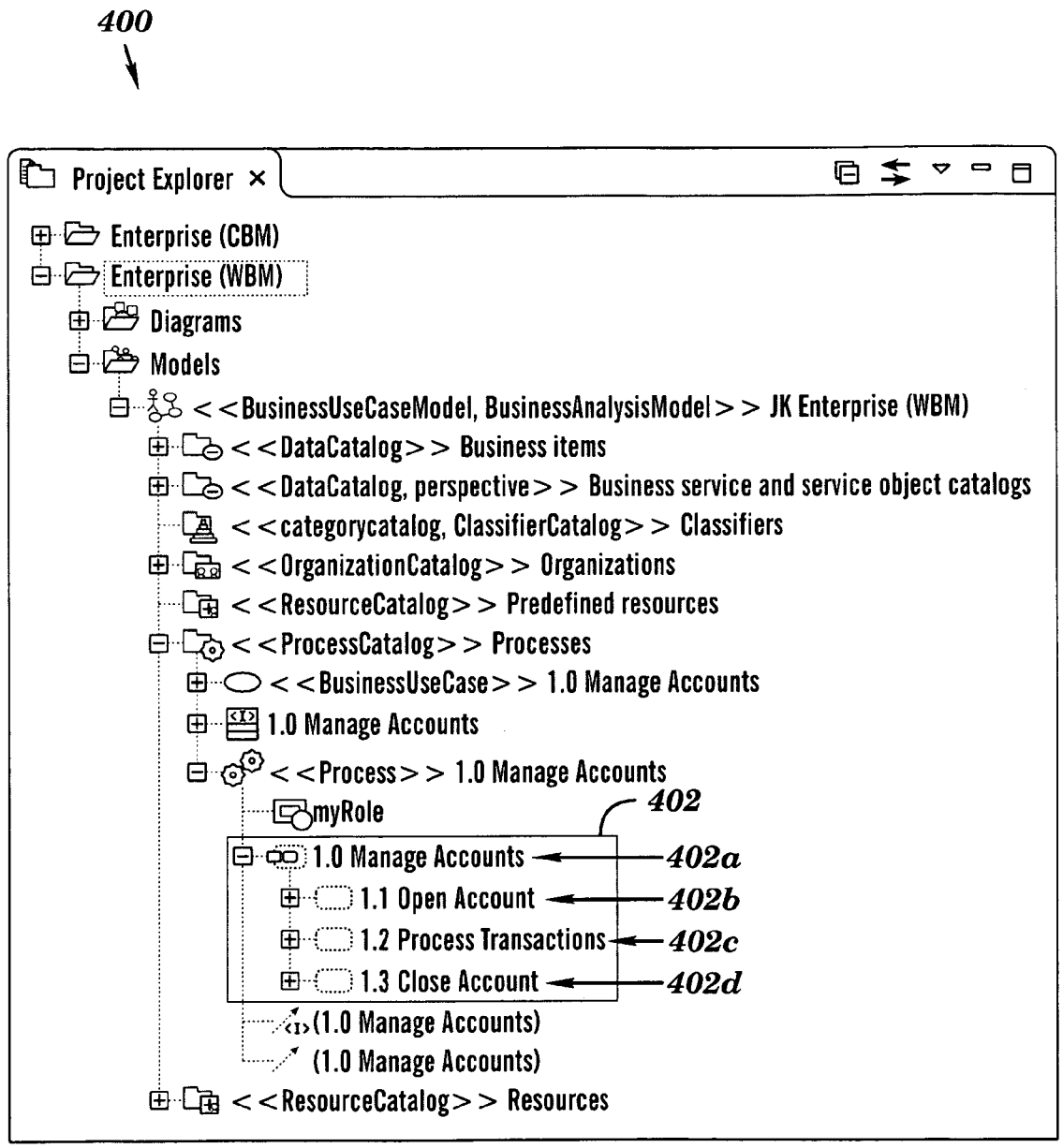
FIG. 4 illustrates a screen shot of processes, in accordance with embodiments of the present invention.

FIG. 4 illustrates a screen shot 400 of business processes 402, in accordance with embodiments of the present invention. The business processes 402 comprise a manage accounts business process 402a, an open account business process 402b, a process transactions business process 402c, and a close account business process 402d as described with respect to example 1 described with reference to FIG. 1. Manage accounts business process 402a, open account business process 402b, and close account business process 402d are mapped to an account & policy administration business component (e.g., account & policy administration business component 302a of FIG. 3). Process transactions business process 402c is mapped to an accounting management business component (e.g., accounting management business component 302b of FIG. 3).

Figure 5:
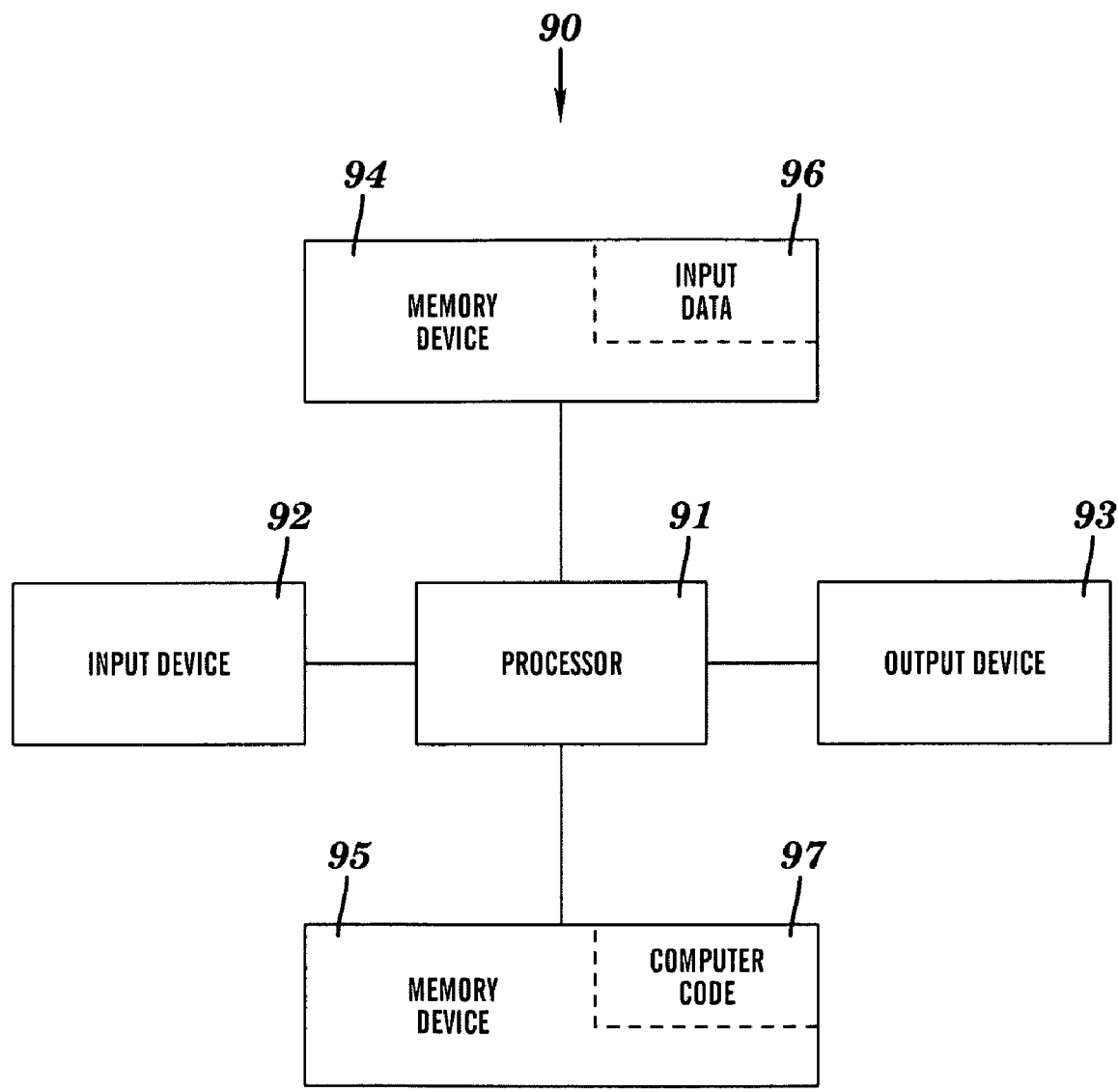
FIG. 5 illustrates a computer apparatus used for identifying services for exposure, in accordance with embodiments of the present invention.

FIG. 5 illustrates a computer apparatus 90 (e.g., computing system 10 of FIG. 1) used for identifying services for exposure, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for identifying services for exposure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to identify services for exposure. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for identifying services for exposure. In another embodiment, the invention provides a method that performs the process steps of the invention on a subscription, advertising, and/or fee basis. That is, a service provider, such as a Solution Integrator, could offer to identify services for exposure. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   reading, by a computing system from a business process map, processes comprised by a service oriented architecture (SOA) project, wherein said processes comprise activities within process elements, wherein said process elements comprise elements associated with accounts and transactions;
   identifying, by said computing system, a first functional area associated with a first current process element of said process elements;
   retrieving, by said computing system from said business process map, first mapping data indicating relationships between said first current process element and said first functional area;
   retrieving, by said computing system from said business process map, second mapping data indicating relationships between said first current process element and a first business component;
   identifying, by said computing system, a second functional area associated with a first parent process element of said first current process element;
   retrieving, by said computing system from said business process map, third mapping data indicating relationships between said first parent process element and said second functional area;
   retrieving, by said computing system from said business process map, fourth mapping data indicating relationships between said first parent process element and a second business component;
   analyzing, by said computing system, said first mapping data, said second mapping data, said third mapping data, and said fourth mapping data;
   comparing, by said computing system, said first functional area to said second functional area;
   determining, by a computer processor of said computing system based on results of said analyzing and said comparing said first functional area to said second functional area, if said first functional area comprises a same functional area as said second functional area;
   generating, by said computing system, results of said determining;
   storing, by said computing system, said results;
   generating, by said computing system, a first map illustrating said processes mapped to said first business component and said second business component; and
   presenting, by said computing system to a user via a display device, a first specified screen illustrating said first map.

2. The method of claim 1, wherein said determining determines that said first functional area does not comprise a same functional area as said second functional area, and wherein said method further comprises;
   identifying, by said computing system, a first service associated with said first current process element; and
   marking, by said computing system, said first service as a first potential service.

3. The method of claim 2, further comprising:
   generating, by said computing system, a list comprising said first potential service, wherein said list identifies said first potential service as a qualified service for exposure; and
   transmitting said list to a user.

4. The method of claim 1, wherein said determining determines that said first functional area comprises a same functional area as said second functional area, and wherein said method further comprises;
   identifying, by said computing system, a third functional area associated with a second current process element of said process elements;
   identifying, by said computing system, a fourth functional area associated with a second parent process element of said second current process element;
   comparing, by said computing system, said third functional area to said fourth functional area; and
   determining, by said computing system based on results of said comparing said third functional area to said fourth functional area, that said third functional area does not comprise comprises a same functional area as said fourth functional area;
   identifying, by said computing system, a first service associated with said second current process element; and
   identifying, by said computing system, said first service as a first potential service;
   generating, by said computing system, a list comprising said first potential service, wherein said list identifies said first potential service as an applicable service for exposure; and
   transmitting said list to a user.

5. The method of claim 1, wherein said processes are root level processes.

6. The method of claim 1, wherein each process element of said process elements comprises a process, a sub-process, and a task.

7. The method of claim 1, wherein said computing system comprises a plurality of UML based modeling tools for performing the method of claim 1.

8. A process for supporting computer infrastructure, said process comprising providing at least one support service for at least one of creating, integrating, hosting, maintaining, and deploying computer-readable code in a computing system comprising a processor, wherein the processor carries out instructions contained in the computer-readable code causing the computing system to perform a method comprising:

reading, by said computing system from a business process map, processes comprised by a service oriented architecture (SOA) project, wherein said processes comprise activities within process elements, wherein said process elements comprise elements associated with accounts and transactions;

identifying, by said computing system, a first functional area associated with a first current process element of said process elements;

retrieving, by said computing system from said business process map, first mapping data indicating relationships between said first current process element and said first functional area;

retrieving, by said computing system from said business process map, second mapping data indicating relationships between said first current process element and a first business component;

identifying, by said computing system, a second functional area associated with a first parent process element of said first current process element;

retrieving, by said computing system from said business process map, third mapping data indicating relationships between said first parent process element and said second functional area;

retrieving, by said computing system from said business process map, fourth mapping data indicating relationships between said first parent process element and a second business component;

analyzing, by said computing system, said first mapping data, said second mapping data, said third mapping data, and said fourth mapping data;

comparing, by said computing system, said first functional area to said second functional area;

determining, by said processor of said computing system based on results of said analyzing and said comparing said first functional area to said second functional area, if said first functional area comprises a same functional area as said second functional area;

generating, by said computing system, results of said determining;

storing, by said computing system, said results;

generating, by said computing system, a first map illustrating said processes mapped to said first business component and said second business component; and presenting, by said computing system to a user via a display device, a first specified screen illustrating said first map.

9. A computer program product, comprising a computer storage device storing a computer readable program code, said computer readable program code comprising an algorithm that when executed by a computer processor of a computing system implements a method, said method comprising:

reading, by said computing system from a business process map, processes comprised by a service oriented architecture (SOA) project, wherein said processes comprise activities within process elements, wherein said process elements comprise elements associated with accounts and transactions;

identifying, by said computing system, a first functional area associated with a first current process element of said process elements;

retrieving, by said computing system from said business process map, first mapping data indicating relationships between said first current process element and said first functional area;

retrieving, by said computing system from said business process map, second mapping data indicating relationships between said first current process element and a first business component;

identifying, by said computing system, a second functional area associated with a first parent process element of said first current process element;

retrieving, by said computing system from said business process map, third mapping data indicating relationships between said first parent process element and said second functional area;

retrieving, by said computing system from said business process map, fourth mapping data indicating relationships between said first parent process element and a second business component;

analyzing, by said computing system, said first mapping data, said second mapping data, said third mapping data, and said fourth mapping data;

comparing, by said computing system, said first functional area to said second functional area;

determining, by said computer processor of said computing system based on results of said analyzing and said comparing said first functional area to said second functional area, if said first functional area comprises a same functional area as said second functional area;

generating, by said computing system, results of said determining;

storing, by said computing system, said results;

generating, by said computing system, a first map illustrating said processes mapped to said first business component and said second business component; and presenting, by said computing system to a user via a display device, a first specified screen illustrating said first map.

10. A computing system comprising a processor coupled to a computer-readable memory unit, said memory unit comprising a computer readable code comprising instructions that when executed by the processor implements a method comprising:

reading, by said computing system from a business process map, processes comprised by a service oriented architecture (SOA) project, wherein said processes comprise activities within process elements, wherein said process elements comprise elements associated with accounts and transactions;

identifying, by said computing system, a first functional area associated with a first current process element of said process elements;

retrieving, by said computing system from said business process map, first mapping data indicating relationships between said first current process element and said first functional area;

retrieving, by said computing system from said business process map, second mapping data indicating relationships between said first current process element and a first business component;

identifying, by said computing system, a second functional area associated with a first parent process element of said first current process element;

retrieving, by said computing system from said business process map, third mapping data indicating relationships between said first parent process element and said second functional area;

retrieving, by said computing system from said business process map, fourth mapping data indicating relationships between said first parent process element and a second business component;

analyzing, by said computing system, said first mapping data, said second mapping data, said third mapping data, and said fourth mapping data;

comparing, by said computing system, said first functional area to said second functional area;

determining, by said processor of said computing system based on results of said analyzing and said comparing said first functional area to said second functional area, if said first functional area comprises a same functional area as said second functional area;

generating, by said computing system, results of said determining;

storing, by said computing system, said results;

generating, by said computing system, a first map illustrating said processes mapped to said first business component and said second business component; and presenting, by said computing system to a user via a display device, a first specified screen illustrating said first map.

11. A method comprising:

reading, by a computing system, processes comprised by a service oriented architecture (SOA) project, wherein said processes comprise activities associated with process elements, wherein said process elements comprise elements associated with accounts and transactions;

first determining, by said computing system, if a first functional area associated with a first current process element of said process elements is available;

retrieving, by said computing system from said business process map, first mapping data indicating relationships between said first current process element and said first functional area;

retrieving, by said computing system from said business process map, second mapping data indicating relationships between said first current process element and a first business component;

second determining, by said computing system, if a second functional area associated with a first parent process element of said first current process element is unavailable, wherein first results of said first determining and said second determining indicate that said first functional area or said second functional area is unavailable;

retrieving, by said computing system from said business process map, third mapping data indicating relationships between said first parent process element and said second functional area;

retrieving, by said computing system from said business process map, fourth mapping data indicating relationships between said first parent process element and a second business component;

analyzing, by said computing system, said first mapping data, said second mapping data, said third mapping data, and said fourth mapping data;

identifying, by said computing system in response to said first results, said first business component associated with said first current process element;

identifying, by said computing system in response to said first results, said second business component associated with said first parent process element;

comparing, by said computing system, said first business component to said second business component;

third determining, by a computer processor of said computing system based on results of said analyzing and said comparing said first business component to said second business component, if said first business component comprises a same business component as said second business component;

generating, by said computing system, results of said third determining;

storing, by said computing system, said results;

generating, by said computing system, a first map illustrating said processes mapped to said first business component and said second business component; and presenting, by said computing system to a user via a display device, a first specified screen illustrating said first map.

12. The method of claim 11, wherein said third determining determines that said first business component does not comprise a same business component as said second business component, and wherein said method further comprises;

identifying, by said computing system, a first service associated with said first current process element; and marking, by said computing system, said first service as a first potential service.

13. The method of claim 12, further comprising:

generating, by said computing system, a list comprising said first potential service, wherein said list identifies said first potential service as a qualified service for exposure; and transmitting said list to a user.

14. The method of claim 11, wherein said third determining determines that said first business component comprises a same business component as said second business component, and wherein said method further comprises;

identifying, by said computing system, a third business component associated with a second current process element of said process elements;

identifying, by said computing system, a fourth business component associated with a second parent process element of said second current process element;

comparing, by said computing system, said third business component to said fourth business component; and determining, by said computing system based on results of said comparing said third business component to said fourth business component, that said third business component does not comprise comprises a same business component as said fourth business component;

identifying, by said computing system, a first service associated with said second current process element; and marking, by said computing system, said first service as a first potential service;

generating, by said computing system, a list comprising said first potential service, wherein said list identifies said first potential service as a qualified service for exposure; and transmitting said list to a user.

15. The method of claim 11, wherein said processes are root level processes.

16. The method of claim 11, wherein each process element of said process elements comprises a process, a sub-process, and a task.

17. The method of claim 11, wherein said computing system comprises a plurality of UML based modeling tools for performing the method of claim 11.

* * * * *